United States Patent
Kozaki

(10) Patent No.: US 9,393,893 B2
(45) Date of Patent: Jul. 19, 2016

(54) VEHICLE SEAT

(71) Applicant: TOYOTA BOSHOKU KABUSHIKI KAISHA, Aichi-ken (JP)

(72) Inventor: Keiji Kozaki, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/694,312

(22) Filed: Apr. 23, 2015

(65) Prior Publication Data

US 2015/0307000 A1 Oct. 29, 2015

(30) Foreign Application Priority Data

Apr. 25, 2014 (JP) ................................. 2014-091106

(51) Int. Cl.
- *B60R 21/207* (2006.01)
- *B60R 21/2155* (2011.01)
- *B60R 21/231* (2011.01)
- *B60N 2/58* (2006.01)
- *B60N 2/64* (2006.01)

(52) U.S. Cl.
CPC .. *B60N 2/58* (2013.01); *B60N 2/64* (2013.01); *B60R 21/207* (2013.01); *B60R 21/2155* (2013.01); *B60R 21/23138* (2013.01); *B60N 2002/5808* (2013.01); *B60R 2021/23146* (2013.01)

(58) Field of Classification Search
CPC .... B60N 2/58; B60N 2/64; B60N 2002/5808; B60R 21/207; B60R 21/2155; B60R 21/23138; B60R 2021/23146
See application file for complete search history.

(56) References Cited

U.S. PATENT DOCUMENTS

| | | | | |
|---|---|---|---|---|
| 5,860,673 A * | 1/1999 | Hasegawa | ............. | B60R 21/207 280/728.3 |
| 5,893,579 A * | 4/1999 | Kimura | ................ | B60N 2/5825 280/728.3 |
| 5,927,749 A * | 7/1999 | Homier | ................ | B60N 2/5883 280/728.3 |
| 5,938,232 A * | 8/1999 | Kalandek | ............. | B60R 21/207 280/728.3 |
| 5,988,674 A * | 11/1999 | Kimura | ................ | B60R 21/207 280/728.3 |

(Continued)

FOREIGN PATENT DOCUMENTS

| | | |
|---|---|---|
| DE | 19848905 A1 | 5/1999 |
| JP | 10-053089 | 2/1998 |

OTHER PUBLICATIONS

Office Action in German Application No. 102015207487.0, with partial English language translation, dated Feb. 11, 2016.

*Primary Examiner* — Laura Freedman
(74) *Attorney, Agent, or Firm* — Greenblum & Bernstein, P.L.C.

(57) ABSTRACT

A vehicle seat is configured in such a way that webbing of a strip shape more difficult to elongate than a seat cover is provided around an airbag at a back side of the seat cover, and a bulging portion is caused to crack by means of tension of the webbing accompanying inflation of the airbag, wherein a hanging member more difficult to elongate than the seat cover is provided on a part of the seat cover, a pleat portion that is a part of the seat cover and to which the hanging member is mounted, is pulled towards an inside of the seat, the hanging member is locked to a locking member at the seat pad side, one end side of the webbing is mounted at the bulging portion side, and the other end side of the webbing is mounted to the hanging member or the locking member in a position closer to the inside of the seat than the pleat portion.

5 Claims, 3 Drawing Sheets

(56) References Cited

U.S. PATENT DOCUMENTS

| | | | | |
|---|---|---|---|---|
| 6,003,939 A * | 12/1999 | Nakai | B60R 21/207 | 297/216.13 |
| 6,045,151 A * | 4/2000 | Wu | B60R 21/207 | 280/728.3 |
| 6,074,003 A * | 6/2000 | Umezawa | B60R 21/207 | 280/730.1 |
| 6,386,577 B1 * | 5/2002 | Kan | B60R 21/207 | 280/728.1 |
| 7,556,287 B2 * | 7/2009 | Inoue | B60R 21/207 | 280/728.2 |
| 7,677,594 B2 * | 3/2010 | Hazlewood | B60N 2/5883 | 280/728.2 |
| 7,950,689 B2 * | 5/2011 | Kim | B60R 21/207 | 280/730.2 |
| 8,079,640 B2 * | 12/2011 | Kim | B60R 21/207 | 297/218.1 |
| 2014/0375028 A1 | 12/2014 | Sahashi | | |

* cited by examiner

VEHICLE SEAT

INCORPORATION BY REFERENCE

The disclosure of Japanese Patent Application No. 2014-091106 filed on Apr. 25, 2014 including the specification, drawings and abstract is incorporated herein by reference in its entirety.

BACKGROUND OF THE INVENTION

1. Field of the Invention

The invention relates to a vehicle seat including an airbag, a bulging portion (a seam of a seat cover) that becomes a bulging position of the airbag, and webbing (a member that causes the bulging portion to crack).

2. Description of Related Art

As such a vehicle seat, a commonly known vehicle seat includes a seat cushion and a seatback raised up from the seat cushion (see Japanese Patent Application Publication No. 10-53089 (JP 10-53089 A)). In the commonly known art, the seatback includes a seat pad that constitutes a contour of the seat and elastically supports an occupant, a seat cover that covers the seat pad, an airbag, and webbing. Here, the seat cover is formed by sewing a plurality of skin pieces into a bag shape. Besides, the airbag is a member (a bag body) that inflates through inflow of air, and provided at a side portion of the seatback (a back side of the seat pad). Besides, the airbag inflates and bulges from a bulging portion (a seam that sews adjacent skin pieces) of the seat cover towards an outside of the seat. Besides, the webbing is cloth of a strip shape, mounted at the back side of the seat cover, and provided in a manner of covering a side of the airbag.

In the commonly known art, the seat pad is provided on a seat frame and covered with the seat cover. At this time, the webbing is used to cover a side of the airbag, one end side of the webbing is sewed to the bulging portion where the airbag bulges, and the other end side of the webbing is sewed to the other part of the seat cover. Besides, the airbag bulges from the bulging portion to protect an occupant upon impact or the like due to a vehicle collision. At this time, the bulging portion cracks due to tension (stretch) of the webbing accompanying inflation of the airbag, whereby the airbag can bulge smoothly.

SUMMARY OF THE INVENTION

However, in such a structure of the seat, it is desirable to advance a timing for bulging the airbag greatly. However, in a structure of the commonly known art, prior to tension of the webbing upon inflation of the airbag, the other part of the seat cover sewed to the other end of the webbing elongate slightly. Accordingly, after stretch of the other part of the seat cover completes, the webbing is tensioned to pull the bulging portion (transferring of a pulling force to the bulging portion is delayed). Compared to inflation of the airbag, crack of the bulging portion is apt to be delayed slightly. Of course, it is optionally feasible to suppress elongation or the like of the other part of the seat cover to expedite transferring of the pulling force of the webbing. For example, in such a structure of the seat, sometimes a part of the seat cover is locked in a pulled-in state at the seat pad side via a hanging cloth that is difficult to elongate relatively. Thus, a solution in which the other end side of the webbing is pulled and sewn to the other part of the seat cover in a tensioned state may be taken into consideration. However, it is impossible to avoid the case in which the other part of the seat cover (in the pulled-in state) elongate slightly along with the hanging cloth, so there is certain limit in terms of advancing transferring of the pulling force of the webbing to the bulging portion. The present invention is made in view of the aforesaid point, and aims to solve the problem of causing the bulging portion as the bulging position of the airbag to crack more quickly.

The vehicle seat according to a first aspect of the invention has a seat structure member such as a seat cushion, a seatback or the like. Besides, the seat structure member has a seat pad that constitutes a contour of the seat and elastically supports an occupant, a seat cover covering the seat pad, and an airbag inflatable through inflow of air. In the present invention, a plurality of skin pieces are sewed to form the seat cover, and the airbag can bulge from a bulging portion formed by sewing adjacent ones of the skin pieces to each other towards an outside of the seat. Besides, webbing of a strip shape more difficult to elongate than the seat cover is provided around the airbag at a back side of the seat cover, and the bulging portion is caused to crack by means of stretch of the webbing accompanying inflation of the airbag. Besides, in the present invention, a hanging member more difficult to elongate than the seat cover is mounted on a part of the seat cover, the hanging member is pulled towards an inside of the seat relative to a mounting part, i.e., a pleat portion, as the part of the seat cover, and the hanging member is locked to a locking member at the seat pad side. So, a structure in which an end side of the webbing is mounted to the bulging portion side and the other end side of the webbing is mounted to the hanging member or the locking member at a position closer to the inside of the seat than the pleat portion, is formed. In the present aspect, the other end side of the webbing is mounted to the hanging member or the locking member (a part that is ultimately free of influence of elongation of the seat cover) at a position closer to the inside of the seat than the pleat portion, whereby the pulling force of the webbing can be transferred to the bulging portion quickly.

According to the first aspect of the invention, the bulging portion as the bulging position of the airbag can be caused to crack more quickly.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
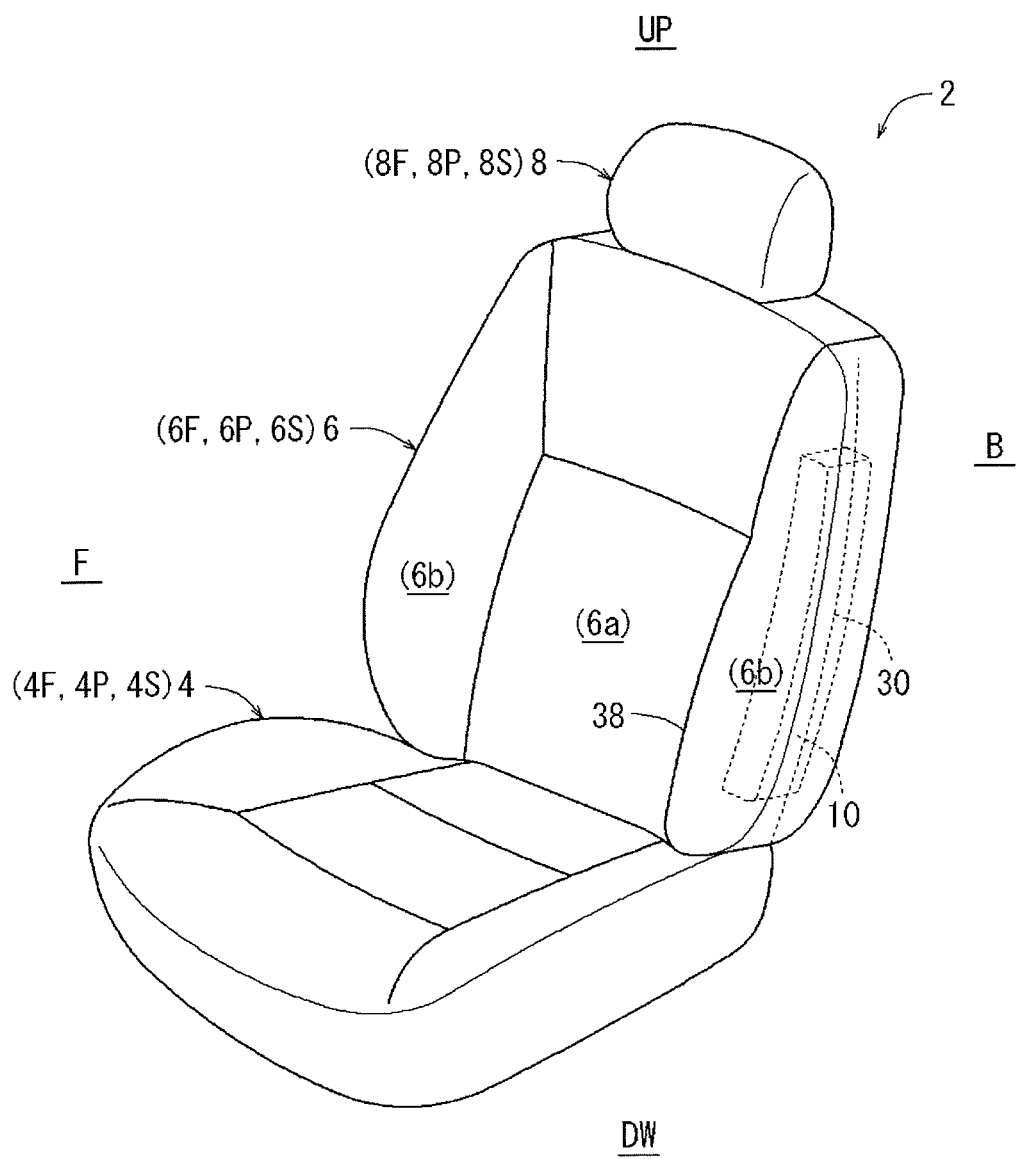
FIG. 1 is a perspective view of a vehicle seat.

An embodiment of the present invention is described with reference to FIGS. 1-3 below. It need be noted that in each of the drawings, a front direction of a vehicle seat is denoted appropriately by symbol F, a rear direction of the vehicle seat is denoted appropriately by B, an upward direction of the vehicle seat is denoted appropriately by symbol UP, and a downward direction of the vehicle seat is denoted appropriately by symbol DW. A vehicle seat 2 in FIG. 1 includes a seat cushion 4, a seatback 6, and a headrest 8. Each of the aforesaid seat structure members includes a seat frame (4F, 6F, 8F) constituting a framework of the seat, a seat pad (4P, 6P, 8P) constituting a contour of the seat, and a seat cover (4S, 6S, 8S) covering the seat pad. In the present embodiment, the seatback 6 is connected to a rear part of the seat cushion 4 in such a way that it can be raised up and laid down, and the headrest 8 is provided at an upper part of the seatback 6 (in a raised-up state).

(Seatback) The seatback 6 includes basic structures (6F, 6P, 6S), an airbag 10, and associated structures (a bulging portion 30, a hanging member 32, a locking member 34, webbing 36, and a pleat portion 38) (see FIGS. 2 and 3, the details of each member will be discribed later). In the present embodiment, due to impact upon a vehicle collision, the airbag 10 is caused to bulge from a side portion (the bulging portion 30) of the seatback 6 towards an outside of the seat to protect a side part of an occupant. At this time, the webbing 36 (details will be discribed later) is provided around the airbag 10, and mounted at a back side of the seat cover 6S. The bulging portion 30 is caused to crack by means of stretch of the webbing 36 accompanying inflation of the airbag 10, whereby the airbag 10 bulges from the bulging portion 30 towards the outside of the seat. In such a structure, it is preferable to cause the bulging portion 30 that becomes a bulging position of the airbag 10 to crack more quickly, and greatly advance bulging of the airbag 10. Thus, in the embodiment, a structure to be discribed later is used to cause the bulging portion 30 to crack more quickly. Each of the structures is discribed in detail below.

(Airbag) Here, the airbag 10 (in a non-inflated state) is a member of an approximately rectangular parallelepiped shape, and provided in a side part (an edge portion 6b to be discribed later) of the seatback 6 (see FIGS. 2 and 3). The airbag 10 according to the present embodiment bulges (inflates and protrudes) towards the outside of the seat due to impact upon a vehicle collision, whereby a body part ranging from a breast to a waist of an occupant for example can be protected. It need be noted that the airbag 10 may be a structure in communication with an air supply device (omitted in the drawings), or a structure in which a gas generator is enclosed.

(Basic Structures of Seatback) The seatback 6 according to the present embodiment is formed by providing the seat pad 6P on the seat frame 6F and covering the seat pad 6P with the seat cover 6S (see FIGS. 1 and 3), as will be discribed later. Besides, the seat frame 6F is a frame member of an arch shape, and may be formed of a material (metal or hard resin, etc.) with a good rigidity. In the present embodiment, the airbag 10 in a non-inflated state is fixed at a side part of the seat frame 6F, and provided at a back side of the seat pad 6P (see FIG. 3).

Figure 2:
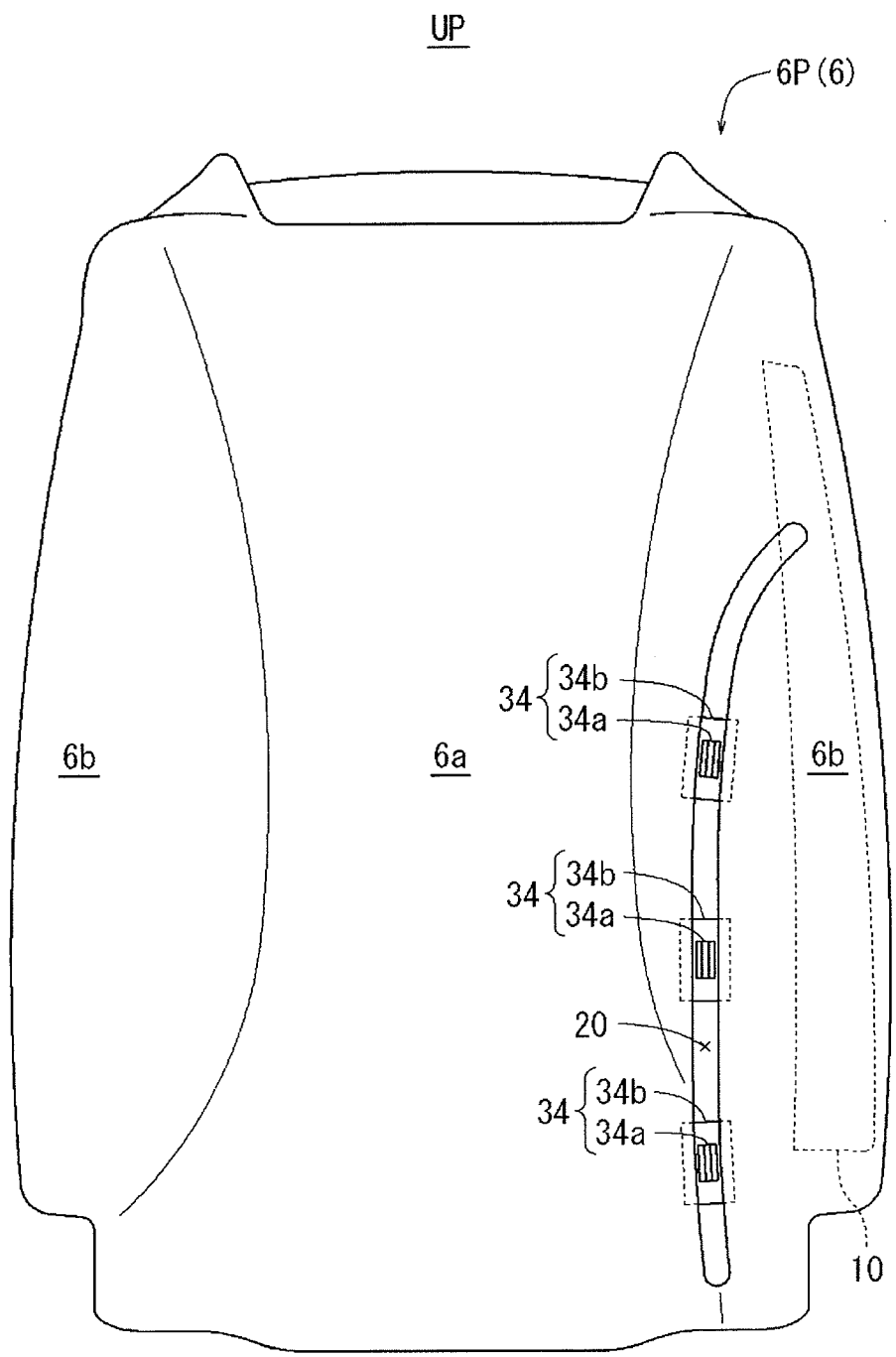
FIG. 2 is a front view of a seat pad.
Figure 3:
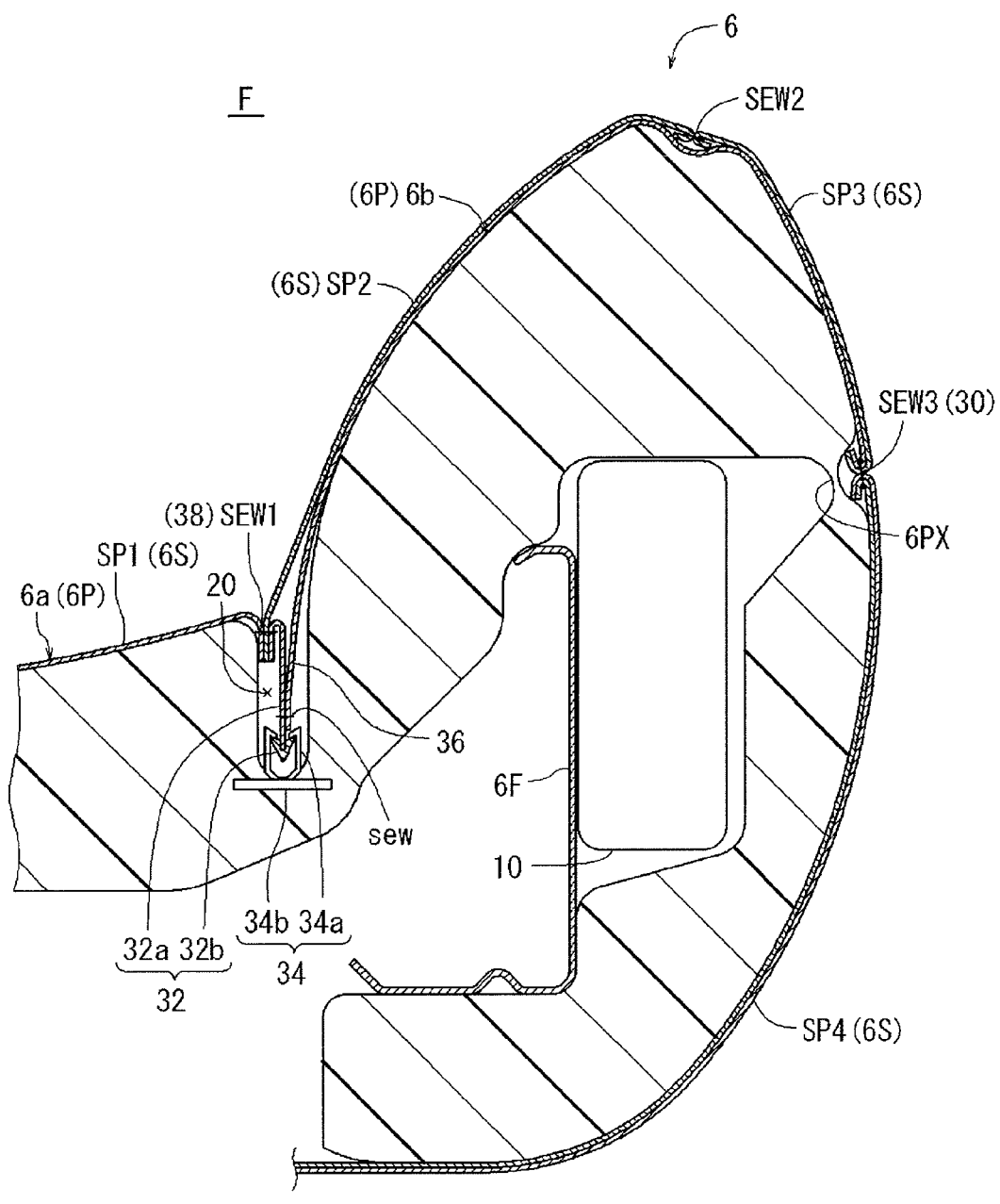
FIG. 3 is a sectional view of a part of a seatback.

(Seat Pad) Besides, the seat pad 6P is a member that can elastically support an occupant, and may be formed of a resin that can expand and contract elastically (see FIGS. 2 and 3). Examples of such a resin may be foaming resin such as polyurethane foam (density: 10 kg/m$^3$-60 kg/m$^3$). Besides, the seat pad 6P according to the present embodiment is of an approximately rectangular shape (from the front view), and includes a seating portion 6a, an edge portion 6b, a groove portion 20, a weak portion 6PX, and a locking member 34 to be discribed later (see FIGS. 2 and 3). The seating portion 6a is a flat part at the center of the seat pad 6P. Besides, the edge portion 6b is a protruding portion provided at a side of the seating portion 6a, and can support a side part of the occupant when the occupant drives to make a turn for example. Besides, the groove portion 20 is a recessed portion formed between the seating portion 6a and the edge portion 6b, and capable of pulling a part of the seat cover 6S inward. The groove portion 20 according to the present embodiment extends in an up-down direction of the seat when the seatback is raised up, and is provided at a position closer to an inside of the seat than the airbag 10. Besides, the weak portion 6PX is a part that is more apt to crack than the other part of the seat pad 6P (see FIG. 3). The weak portion 6PX according to the present embodiment is a recessed part that has a convex surface outwards (a part that is thinner than the other part of the seat pad 6P), and is formed to face a position of forming the bulging portion 30 as will be discribed later.

(Locking Member) Besides, the locking member 34 is a member of a planar plate shape and capable of locking the hanging member 32 (to be discribed later), and provided at a bottom side of the groove portion 20 (see FIG. 3). The locking member 34 according to the present embodiment has an upper part 34a of an approximately U shape (from the sectional view), and a lower part 34b of a planar plate shape, and is fixed inside the seat pad 6P in a form of being embedded. A free end side of the upper part 34a (of the approximately U shape) of the locking member 34 is bent toward an inner side, and is capable of locking a tip end (a locking portion 32b) of the hanging member 32 as will be discribed later. Besides, in the present embodiment, a plurality of locking members 34 are arranged inside the groove portion 20 at a proper interval (at a side of the airbag 10).

(Seat Cover) Besides, the seat cover 6S is a member of a bag shape and capable of covering the seat pad 6P, and includes a bulging portion 30, a hanging member 32, webbing 36, and a pleat portion 38 (see FIG. 3). The seat cover 6S according to the present embodiment is formed by sewing a plurality of skin pieces (SP1-SP4, etc.) into a bag shape, and sewing parts (SEW1-SEW3, etc.) are formed between the adjacent skin pieces. A first skin piece SP1 is a piece covering the seating portion 6a, and a second skin piece SP2 is a piece covering the seating side (a bolster) of the edge portion 6b. Besides, a third skin piece SP3 is a piece covering the seating side of a side face (frame portion) of the seat, and a fourth skin piece SP4 is a piece covering a back side of the side face (frame portion) of the seat. It need be noted that examples of the material of each skin piece may be cloth (textile fabric, braided fabric, non-woven fabric) made of natural fiber or synthetic fiber, or leather (natural leather or synthetic leather). Besides, in the present embodiment, the first skin piece SP1 is sewed to the second skin piece SP2 by means of a sewing part SEW1 at a position of forming the groove portion 20. Besides, the second skin piece SP2 is sewed to the third skin piece SP3 by means of a sewing part SEW2 in the vicinity of a vertex of the edge portion 6b. Besides, the third skin piece SP3 is sewed to the fourth skin piece SP4 by means of a sewing part SEW3 at midway of the side face (frame portion) of the seat.

(Bulging Portion) The bulging portion 30 is a sewing part (seam) of adjacent skin pieces, and cracks along with inflation of the airbag 10 (see FIGS. 1 and 3). The bulging portion 30 according to the present embodiment is a sewing part SEW3 of the third skin piece SP3 and the fourth skin piece SP4, and extends in an up-down direction of the seat at a side of the edge portion 6b. Here, a tensile strength (seam strength) of the bulging portion 30 is not specifically limited as long as crack can occur via tension of webbing 36 as will be discribed later, but is typically set between a range of 30-50 N.

(Hanging Member-Pleat Portion) The hanging member 32 is a member that can be provided along the groove portion 20, and includes hanging cloth 32a that can be mounted on a part of the seat cover 6S and a locking portion 32b lockable to a locking member 34 (see FIG. 3). The hanging cloth 32a (surface material) is formed of a material (a material of good tensile strength) that is more difficult to elongate than the seat cover 6S and may be selected from the examples of the material of the seat cover 6S. For example, in the present embodiment, the seat cover 6S may be formed of textile fabric made of synthetic fibers, and the hanging cloth 32a is formed of non-woven fabric (a material more difficult to elongate than the textile fabric) also made of synthetic fibers. Besides, in the present embodiment, the hanging cloth 32a is attached on a back side of the second skin piece SP2. In this state, one end of the hanging cloth 32a is sewed and mounted to the sewing part SEW1 (forming a pleat portion 38) of the first skin piece SP1 and the second skin piece SP2. The pleat portion 38 (the sewing part SEW1) is formed along the groove portion 20 to extend in the up-down direction of the seat, as described below.

Besides, the locking portion 32b according to the present embodiment is a member (typically a resin member) of an approximately triangular shape from the sectional view, and is provided at the other end (tip end) of the hanging cloth 32a. It need be noted that a flat plate member that is a slim bar along an extension direction of the hanging cloth 32a may serve as the locking portion 32b. Besides, a plurality of locking portions 32b (short flat plates) are mounted at proper parts of the hanging cloth 32a according to a number of the locking members 34 provided, and can be configured to face the respective locking members 34.

(Webbing) The webbing 36 is a member of a strip shape that can be provided around the airbag 10, and can be mounted to the seat cover 6S and the hanging member 32 (see FIG. 3). The webbing 36 is made of a material (a material of a good tensile strength) more difficult to elongate than the seat cover 6S, which may be selected from the examples of the material of the seat cover 6S. Besides, the webbing 36 according to the present embodiment has a length dimension such that the webbing 36 can be arranged along the hanging member 32 (the hanging cloth 32a) after passing through the second skin piece SP2 and the third skin piece SP3. Thus, in the present embodiment, the webbing 36 is attached to a back side of the second skin piece SP2 and the third skin piece SP3. In this state, one end side of the webbing 36 is sewed and mounted to the sewing part SEW3 (the bulging portion 30) of the third skin piece SP3 and the fourth skin piece SP4. Besides, the other end side of the webbing 36 is sewed to a tip end side (a part close to the locking portion 32b) (forming a sewing part sew) of the hanging cloth 32a, and can be provided in a position closer to the inside of the seat than the pleat portion 38 as will be discribed later. It need be noted that in the present embodiment, a sewing operation of the seat cover 6S and a mounting (sewing) operation of the webbing 36 on the seat cover 6S, etc. can be performed simultaneously. It should be noted that preferably thread constituting the sewing part sew has a higher strength than thread constituting the sewing parts SEW1-SEW3 of the respective skin pieces.

(Assembling Operation of Seatback) With reference to FIG. 3, the seat pad 6P is provided on the seat frame 6F and covered with the seat cover 6S. At this time, in the present embodiment, the hanging member 32 is pulled towards the inside of the seat, and each of the locking portions 32b is locked in the respective locking member 34. Accordingly, the sewing part SEW1 (the pleat portion 38) of the first skin piece SP1 and the second skin piece SP2 has a recessed shape along the groove portion 20, and is provided at a side of the airbag 10. Besides, in the present embodiment, the other end (the sewing part sew) of the webbing 36 along with the hanging member 32 (the hanging cloth 32a) is provided in a position closer to the inside of the seat than the pleat portion 38. Besides, along with the aforesaid operation, the bulging portion 30 (a sewing part of the third skin piece SP3 and the fourth skin piece SP4) is provided at a side face of the edge portion 6b.

(Bulging of Airbag) With reference to FIGS. 1 and 3, the airbag 10 bulges form the side face (the bulging portion 30) of the edge portion 6b due to impact, etc. upon a vehicle collision to protect a side part of an occupant. At this time, in the present embodiment, the webbing 36 is provided at a seating side of the airbag 10, and is tensioned along with inflation of the airbag 10 (under a pressure from inside the seat). Besides, the bulging portion 30 is caused to crack by use of tension of the webbing 36 to cause the airbag 10 to bulge towards the outside of the seat. In such a structure, it is desired to cause the bulging portion 30 to crack more quickly by use of the webbing 36, whereby the bulging of the airbag 10 can be greatly advanced.

Accordingly, in the present embodiment, a structure in which one end of the webbing 36 is mounted at the bulging portion 30 side and the other end of the webbing 36 is mounted to the hanging member 32 in a position closer to the inside of the seat than the pleat portion 38, is formed. Thus, the other end side of the webbing 36 is mounted to the hanging member 32 (a part that is ultimately free from influence of elongation of the seat cover 6S), whereby the webbing 36 can be tensioned rapidly upon inflation of the airbag 10. Thus, a pulling force of the webbing 36 is transferred to the bulging portion 30 rapidly, whereby bulging of the bulging portion 30 can be advanced. Thus, according to the present embodiment, the airbag 10 bulges smoothly towards the outside of the seat ultimately free of shield by the seat cover 6S (a bulging portion 30 of a non-cracked body).

As stated above, according to the present embodiment, the other end side of the webbing 36 can be mounted to the hanging member 32 (a part free of influence of elongation of the seat cover 6S), whereby a pulling force of the webbing 36 is transferred to the bulging portion 30 quickly. Especially in the present embodiment, the other end side of the webbing 36 is mounted at a tip end side (proximate to the locking portion 32b) of the hanging cloth 32a, whereby influence of elongation of the hanging cloth 32a itself can be ultimately avoided. Thus, according to the present embodiment, the bulging portion 30 that becomes a bulging position of the airbag 10 is caused to crack more quickly, whereby the bulging of the airbag 10 can be advanced greatly.

(Modified Embodiment) Here, the other end of the webbing 36 may be optionally mounted to the locking portion 32b or the locking member 34, besides the hanging cloth 32a. For example, the other end side of the webbing 36 along with the hanging cloth 32a may be mounted directly to the locking portion 32b (a part free of influence of elongation of the hanging cloth 32a). Thus, influence of elongation of the hanging cloth 32a may be avoided, and transfer of a pulling force of the webbing 36 may be expedited, whereby the bulging portion 30 may be caused to crack rapidly so that the airbag 10 is caused to bulge towards the outside earlier.

The vehicle seat according to the present invention is not limited to the aforesaid embodiment, but other various embodiments may be adopted. The present embodiment gives an example of the structure of the webbing 36 (shape, dimension, providing position, providing number, etc.), but does not limit the structure of the member. The webbing may cover a seating side, a side portion, and a back portion of the airbag properly according to the position of the bulging portion. Besides the structure of being sewed to the bulging portion, the webbing may optionally be mounted in the vicinity to the bulging portion via sewing parts different from the bulging portion or by means of adhering, cladding, fasteners, etc. Besides, the present embodiment depicts an example in which the other end side of the webbing 36 is mounted at a tip end side of the hanging cloth 32a via the sewing part sew. The other end side of the webbing may be mounted at a proper position of the hanging member via adhering, cladding, fasteners, etc.

Besides, although the present embodiment gives an example of the structures (shape, dimension, providing position, providing number, etc.) of the locking member 34 and the hanging member 32, it does not intend to limit the structures of these members and the like. For example, as long as the locking member and the hanging member can be locked with each other, various structures (a sling structure, a clamp structure, a hook ring structure, etc.) may be adopted. For example, in the hook ring structure, a metal wire is provided in the groove portion to serve as a locking member, and the other metal wire is provided at a tip end of the hanging member (and the webbing). Besides, a structure in which these metal wires are locked with each other by use of a circular member (hook ring fastening) may be formed. It need be noted that one end side of the hanging cloth may be mounted to a desired skin piece (e.g., the first skin piece or the second skin piece) via adhering, cladding, fasteners, etc. Besides, as for the structure of the hanging member, it is feasible to adopt a structure in which a flat plate portion (corresponding to the hanging cloth) made of resin and the locking portion are integrated.

Besides, the present embodiment gives an example of the structure (shape, dimension, providing position, providing number, etc.) of the airbag 10, but does not intend to limit the structure of the member. Moreover, the structures of the other members (the webbing, the hanging member, the locking member, etc.) may be modified property according to the structure of the airbag.

Moreover, the present embodiment makes the depiction particularly using the seatback 6 as an example, but the structure according to the present embodiment is also applicable to the seat cushion. Besides, the structure according to the present embodiment is also applicable to a vehicle seat for an automobile, an airplane, a trolley, etc. universally.

What is claimed is:

1. A vehicle seat, comprising:
   a seat pad constituting a contour of the seat and elastically supporting an occupant;
   a seat cover formed by sewing a plurality of skin pieces and covering the seat pad;
   an airbag configured to be inflatable through inflow of air and capable of bulging from a bulging portion formed by sewing adjacent ones of the skin pieces to each other towards an outside of the seat;
   webbing of a strip shape that is more difficult to elongate than the seat cover, provided around the airbag at a back side of the seat cover, wherein the bulging portion cracks by means of stretch of the webbing accompanying inflation of the airbag; and
   a hanging member mounted on a part of the seat cover and more difficult to elongate than the seat cover,
   wherein a pleat portion that is a part of the seat cover and to which the hanging member is mounted, is pulled towards an inside of the seat, and the hanging member is locked to a locking member at the seat pad side,
   wherein one end of the webbing is mounted to the bulging portion, and
   wherein the other end of the webbing is mounted to only at least one of the hanging member and the locking member at a position closer to the inside of the seat than the pleat portion.

2. The vehicle seat according to claim 1, wherein the airbag is provided inside a side portion of a seatback, and
   wherein the webbing is provided at a position closer to a seating side of the occupant than the airbag.

3. The vehicle seat according to claim 1, wherein the seat pad has a seating portion that forms a flat part, and an edge portion that forms a protruding portion provided at a side of the seating portion, and
   wherein the locking member is provided in a groove portion formed between the seating portion and the edge portion.

4. The vehicle seat according to claim 1, wherein the locking member comprises a u-shaped upper and a planar plate shaped lower.

5. The vehicle seat according to claim 1, wherein the hanging member comprises a hanging cloth.

* * * * *